United States Patent
Kawato

(10) Patent No.: US 10,083,826 B2
(45) Date of Patent: Sep. 25, 2018

(54) INPUT PROTECTION CIRCUIT FOR HIGH-SPEED ANALOGUE SIGNAL AND TIME-OF-FLIGHT MASS SPECTROMETER

(75) Inventor: Eizo Kawato, Kizugawa (JP)

(73) Assignee: SHIMADZU CORPORATION, Nakagyo-ku, Kyoto (JP)

( * ) Notice: Subject to any disclaimer, the term of this patent is extended or adjusted under 35 U.S.C. 154(b) by 1546 days.

(21) Appl. No.: 12/445,187

(22) PCT Filed: Nov. 2, 2006

(86) PCT No.: PCT/JP2006/321947
§ 371 (c)(1),
(2), (4) Date: Apr. 10, 2009

(87) PCT Pub. No.: WO2008/053555
PCT Pub. Date: May 8, 2008

(65) Prior Publication Data
US 2010/0084551 A1    Apr. 8, 2010

(51) Int. Cl.
*H01J 49/40* (2006.01)
*H02H 9/04* (2006.01)

(52) U.S. Cl.
CPC ............ *H01J 49/40* (2013.01); *H02H 9/042* (2013.01)

(58) Field of Classification Search
CPC .................. H01J 49/40; H02H 9/04
(Continued)

(56) References Cited

U.S. PATENT DOCUMENTS 4,528,546 A * 7/1985 Paoli ............................ 338/195
4,977,357 A * 12/1990 Shrier ............................ 338/21
(Continued)

FOREIGN PATENT DOCUMENTS

EP    0 930 623 A1    7/1999
JP    01-141360 A    6/1989
(Continued)

OTHER PUBLICATIONS

Jeffrey Dunnihoo, 'ESD Protection for High-Speed I/O Signals', 2003, Compliance Engineering Magazine, 2003 Annual Reference Guide.*
(Continued)

*Primary Examiner* — Eliza Osenbaugh-Stewart
(74) *Attorney, Agent, or Firm* — Sughrue Mion, PLLC

(57) ABSTRACT

The present invention is provided to reduce the distortion or delay of the input waveform of a high-speed analog signal due to the capacitance of a protection element inserted for the purpose of ESD protection in an input circuit for a high-speed analog signal, so as to determine the correct waveform of the high-speed analog signal. In an input protection circuit for a high-speed analog signal, a resistor is provided on a signal path connecting an input connector and an input circuit; a polymer ESD protection element is connected between a portion of the signal path, which extends from the resistor to the input connector, and the ground; a semiconductor ESD protection element is connected between a portion of the signal path, which extends from the resistor to the input circuit, and either the ground or power source; and the sum of the resistance value of an input resistor of the input circuit and the resistance value of the resistor is equal to the characteristic impedance of a high-speed analog signal input.

4 Claims, 3 Drawing Sheets

NUMERALS LEGEND for FIG. 4
41 Input Connector
42 Input Circuit
43 Semiconductor ESD Protection Element
44 Input Resistor
45 Polymer ESD Protection Element
47 Resistor

(58) Field of Classification Search
USPC .......................... 361/111, 56, 117; 250/287
See application file for complete search history.

(56) References Cited

U.S. PATENT DOCUMENTS

| | | | |
|---|---|---|---|
| 5,500,546 A * | 3/1996 | Marum et al. ................ | 257/358 |
| 6,282,075 B1 * | 8/2001 | Chaudhry .................... | 361/111 |
| 6,642,297 B1 | 11/2003 | Hyatt et al. | |
| 6,934,136 B2 * | 8/2005 | Duvvury ....................... | 361/56 |
| 7,285,846 B1 * | 10/2007 | Tran .............................. | 257/667 |
| 2004/0217275 A1 * | 11/2004 | Gonin et al. ................. | 250/287 |
| 2006/0016977 A1 | 1/2006 | Kawato | |

FOREIGN PATENT DOCUMENTS

| | | |
|---|---|---|
| JP | 2-77922 U | 6/1990 |
| JP | 11-317113 A | 11/1999 |
| JP | 2006-032207 A | 2/2006 |

OTHER PUBLICATIONS

Fawwaz Ulaby, 'Fundamentals of Applied Electromagnetics', Dec. 23, 1998, Prentice Hall, third edition, p. 80.*
Ming-Dou Ker et al., "ESD Protection Design for 900-MHz RF Receiver with 8-kV HBM ESD Robustness," Microwave Symposium Digest, 2002, pp. 537-540, vol. 1.

* cited by examiner

| NUMERALS LEGEND for FIG. 1 | |
|---|---|
| 11 | Input Connector |
| 12 | Input Circuit |
| 13 | Semiconductor ESD Protection Element |
| 14 | Input Resistor |

| NUMERALS LEGEND for FIG. 3 | |
|---|---|
| 31 | Input Connector |
| 32 | Input Circuit |
| 34 | Input Resistor |
| 35 | Polymer ESD Protection Element |
| 36 | High-Impedance Element |

| NUMERALS LEGEND for FIG. 4 | |
|---|---|
| 41 | Input Connector |
| 42 | Input Circuit |
| 43 | Semiconductor ESD Protection Element |
| 44 | Input Resistor |
| 45 | Polymer ESD Protection Element |
| 47 | Resistor |

INPUT PROTECTION CIRCUIT FOR HIGH-SPEED ANALOGUE SIGNAL AND TIME-OF-FLIGHT MASS SPECTROMETER

TECHNICAL FIELD

The present invention relates to a circuit for protecting elements of an input circuit from an overvoltage due to an electric discharge or other reasons in a circuit for measuring a high-speed analogue signal. Such a circuit is particularly used as an input protection circuit of a transient recorder, which is a type of waveform-recording circuit for determining a signal waveform with the gigaherz (GHz) band.

BACKGROUND ART

The recent increase in the frequency of signals handled by electronic circuits has generally increased the importance of input protection circuits having excellent high-frequency characteristics. An input protection circuit is intended for preventing an electronic circuit from being damaged by an electrostatic discharge (ESD), which may occur in the process of handling the electronic circuit. An ESD is a phenomenon in which electric charges that have accumulated in the human body flow into the entrance (i.e. the input circuit) of the electronic circuit through air discharge or direct contact; this flow of electric charges generates a high voltage in the electronic components arranged in the input circuit and damages them. An electric discharge may also result from a rise in the voltage on the surface of an insulator due to the accumulation of electric charges caused by the action of an air current created, for example, by a fan for cooling an electronic device.

In a time-of-flight mass spectrometer or similar apparatus, a high-speed analogue signal is produced by an ion detector provided within an analyzer section using a high voltage under vacuum, and then fed into a waveform-recording circuit through a coaxial cable or the like (for example, refer to Patent Document 1). In such an apparatus, if an electric discharge occurs within the vacuum space, a high-voltage pulse is induced in the path of the analogue signal and reaches the waveform-recording circuit. Preventing this high-voltage pulse from reaching and damaging the input circuit is also an objective of providing the input protection circuit at the entrance of the waveform-recording circuit.

As shown in FIG. 1, a conventional input protection circuit uses a semiconductor ESD protection element for the purpose of input protection. The semiconductor ESD protection element 13 is provided in the signal path extending from an input connector 11 to an input circuit 12. In the case of measuring a high-speed analogue signal, an input resistor 14 having a resistance value equal to the characteristic impedance of the signal path is provided as a terminator at the entrance of the input circuit 12. The semiconductor ESD protection element 13 internally includes high-speed, low-capacity diodes, each diode having one end connected to the signal path and the other to a power source or ground. In the example of FIG. 1, one diode is connected to a clamping power line $+V_{CL}$; if a high-voltage pulse with a positive polarity has entered the signal path from the input connector 11, this diode will turn to the conducting state and absorb the energy of the high-voltage pulse into the clamping power line $+V_{CL}$, thus preventing the high-voltage pulse from reaching the input circuit 12. The example of FIG. 1 shows another diode, which is connected to another clamping power line $-V_{CL}$ and similarly prevents a high-voltage pulse with a negative polarity from reaching the input circuit 12.

In order to direct the electric current resulting from the high-voltage pulse into the clamping power lines, the voltage of the signal path rises to a voltage that equals the voltage obtained by adding a forward voltage drop of the diode to the clamping power line $+V_{CL}$ or $-V_{CL}$. However, the resultant voltage will not be so high as to damage the input circuit 12. One or both of the destinations of the semiconductor ESD protection element 13 may be connected to the ground in place of the clamping power line if the amplitude of the analogue signal to be handled is small or the signal is unipolar. For example, in the case of handling analogue signals ranging from 0 to 5 V, the ends of the semiconductor ESD protection element 13 are connected to a 5 V source and the ground, respectively.

As just described, the ESD protection circuit using a semiconductor ESD protection element shown in FIG. 1 can confine the voltage of the signal path within a specific voltage range and thus satisfactorily functions as the protector for the input circuit 12. However, the recent increase in the frequency band of the analogue signals to be handled has caused new problems, i.e. the distortion of the waveform of the analogue signal and the reflection of the analogue signal, due to the capacitance of the semiconductor ESD protection element 13.

FIG. 2 shows the result of a simulation of the distortion and reflection of a waveform in the case of feeding a triangular pulse with a rise time of 200 ps, a fall time of 200 ps and a peak height of 1 V into a waveform-recording circuit through a coaxial cable (delay time: 0.5 ns) having a characteristic impedance of 50Ω. Under the condition that the input circuit was terminated by an input resistor of 50Ω the calculation was performed for each of the semiconductor ESD protection elements having the capacitances 0 pF, 1 pF, 2 pF and 3 pF, and the calculated results are indicated by the square, rhombic, inverted triangular, and triangular plots, respectively. The triangular wave located in the lower left section of FIG. 2 is the pulsed voltage that was originally fed into the coaxial cable. The upper section of the same figure shows the voltage waveform created in the input circuit by a 0.5 ns-delayed arrival of the pulse at the waveform-recording circuit. Located in the lower right section of the same figure is the waveform of a reflected wave, which is returned to the transmitting end through the coaxial cable with an additionally delay of 0.5 ns.

In the case where the capacitance is 0 pF, the triangular wave that has entered the input circuit maintains its original form, and no reflection takes place. However, as the capacitance of the semiconductor ESD protection element increases, the increase in the voltage of the input circuit at the rising portion of the triangular wave becomes more delayed. As shown, even after the increasing rate of the voltage has reached a constant value, the voltage of the input circuit is lower than that of the input pulse, and this difference in the voltage is returned to the transmitting end as a reflected wave. An arrival of the input pulse at the waveform-recording circuit does not immediately cause an increase in the voltage of the input circuit since the pulse is initially used to charge up the capacitance of the semiconductor ESD protection element. For pulses at high frequencies, the input is short-circuited by the capacitance of the semiconductor ESD protection element, so that a reflected wave results. The difference between the voltage of the input pulse and that of the input circuit produces an electric current, which is used to charge the capacitance of the semiconductor ESD protection element. After the steady state is reached, the voltage of the input circuit begins to follow the voltage of the incoming pulse. In the case where the capacitance is 1 pF, the current required for charging the capacitance is 1V×1 pF÷200 ps=5 mA. This current is supplied from the 50Ω input resistor and the 50Ω coaxial cable, 2.5 mA each. Accordingly, the voltage appearing in the input circuit is 125 mV lower than that of the pulse and, simultaneously, a reflected wave with an amplitude of −125 mV results.

The decrease in the voltage becomes larger as the peak voltage of the pulse becomes higher. Furthermore, unlike the triangular wave, the waveform that is actually measured by the waveform-recording circuit does not have a constant slope. Therefore, the difference between the voltage of the input pulse and the voltage appearing in the input circuit changes with time, which causes a distortion or delay of the waveform.

The widespread use of high-speed digital communication techniques such as a universal serial bus (USB) or Ethernet in recent years has opened up more opportunities of using low-capacitance ESD protection elements that do not affect the device performance at high frequencies. These elements are called the polymer ESD protection element. This device includes a polymer film, which breaks down and turns to the conducting state when a high voltage is applied to it, thereby absorbing the energy of the electrostatic discharge into the ground or power source. The capacitance of the polymer ESD protection element can be decreased to as low as 0.1 pF, thus making it possible to reduce the distortion or delay of the input-pulse waveform to an allowable level. However, polymers differ from semiconductors in that they normally behave as insulators; turning such a material to the conducting state by breakdown requires a trigger voltage of 100 V or higher to be temporarily applied to it. An input circuit designed for handling signals at high frequencies has a rather low withstand voltage and hence is vulnerable to the application of an overvoltage. Accordingly, it is necessary to provide an additional protection element between the polymer ESD protection element and the input circuit.

An example of the ESD protection circuit using a polymer ESD protection element is shown in FIG. 3. As shown, the polymer ESD protection element 35 is connected to an intermediate point of the signal path extending from the input connector 31 to the input circuit 32. Polymer ESD protection elements are normally a bipolar device and should have the other end connected to the ground. As already explained, a high impedance element 36 is additionally provided between the polymer ESD protection element 35 and the input circuit 32 to prevent the trigger voltage from being directly applied to the input circuit 32 and damaging the input elements. In the USB or other interfaces, due to the signal input in a differential form, a common mode choke coil, filter element or the like is used as the high impedance element 36 in order to obtain a high impedance against the discharge energy while maintaining the high-frequency characteristic.

However, in the case of analogue signals, it is often impossible to adopt the differential signaling scheme. Using a resistor, coil or the like as the high impedance element 36 causes mismatching in the impedance of the signal line and hence a reflection of the signal. Furthermore, since analogue signals to be measured have a broad frequency band, it is impossible to use a filter having such a narrowband that matches the transmission frequency as in the case of the digital communication.

Patent Document 1: Japanese Unexamined Patent Application Publication No. 2006-32207

DISCLOSURE OF THE INVENTION

Problems to be Solved by the Invention

The semiconductor ESD protection element has the problem that its capacitance causes the input waveform to be distorted or delayed and eventually departed from the correct form of the high-speed analogue signal to be measured. This problem is particularly serious for time-of-flight mass spectrometers since they determine the mass of an analysis sample from the arrival time of a pulse. That is, a delay of the waveform leads to an error of the mass measurement value, whereas a distortion of the waveform causes an increase in the pulse width and hence a deterioration in the mass measurement resolution. These factors will significantly deteriorate the performance of the analyzing device.

On the other hand, the low-capacitance polymer ESD protection element requires a high trigger voltage and hence cannot be used, in its original form, as a protection element for broadband analogue signals.

Means for Solving the Problems

In order to solve the aforementioned problems, the present invention provides an input protection circuit for a high-speed analogue signal, which is characterized in that: a resistor is provided on a signal path connecting an input connector and an input circuit; a polymer ESD protection element is connected between a portion of the signal path, which extends from the resistor to the input connector, and the ground; a semiconductor ESD protection element is connected between a portion of the signal path, which extends from the resistor to the input circuit, and either the ground or power source; and the sum of the resistance value of an input resistor of the input circuit and the resistance value of the aforementioned resistor is equal to the characteristic impedance of a high-speed analogue signal input.

In one mode of the present invention, the input protection circuit for a high-speed analogue signal is further characterized in that the resistor is a pulse-resistant resistor or surge-resistant resistor.

Effects of the Invention

In the input protection circuit for a high-speed analogue signal according to the present invention, most of the electrostatic discharge energy is absorbed through the low-capacitance polymer ESD protection element into the ground and, simultaneously, the trigger voltage that occurs in the low-capacitance polymer ESD protection element is clamped to either the power source or ground by the resistor and the semiconductor ESD protection element, so that no overvoltage can arise in the input circuit. The use of the pulse-resistant resistor or surge-resistant resistor is aimed at preventing damages to the resistor due to the application of the trigger voltage.

For high-speed analogue signals, the sum of the resistance value of the input resistance of the input circuit and the resistance value of the resistor is equalized to the characteristic impedance of the high-speed analogue signal input so as to achieve the impedance matching and thereby prevent the reflection of the high-speed analogue signal. The resistance value of the input resistor of the input circuit can be decreased to a value smaller than the characteristic impedance. Therefore, it is possible to reduce the distortion or delay of the waveform of the high-speed analogue signal due to the capacitance of the semiconductor ESD protection element to a practically allowable level. The decrease in the gain of the high-speed analogue signal due to the reduction in the resistance value of the input resistor does not cause any problem since it can be compensated for by increasing the gain of the input circuit.

EXPLANATION OF NUMERALS

11 . . . Input Connector
12 . . . Input Circuit
13 . . . Semiconductor ESD Protection Element
14 . . . Input Resistor
31 . . . Input Connector
32 . . . Input Circuit
34 . . . Input Resistor
35 . . . Polymer ESD Protection Element
36 . . . High-Impedance Element
41 . . . Input Connector
42 . . . Input Circuit
43 . . . Semiconductor ESD Protection Element
44 . . . Input Resistor
45 . . . Polymer ESD Protection Element
47 . . . Resistor
61 . . . Ion Generator
62 . . . Ion Detector
63 . . . Input Protection Circuit
64 . . . Waveform-Recording Circuit
65 . . . Data Processor
66 . . . Control Circuit

BEST MODE FOR CARRYING OUT THE INVENTION

An input protection circuit for a high-speed analogue signal according to the present invention is hereinafter described in detail with reference to the drawings.

Figure 4:
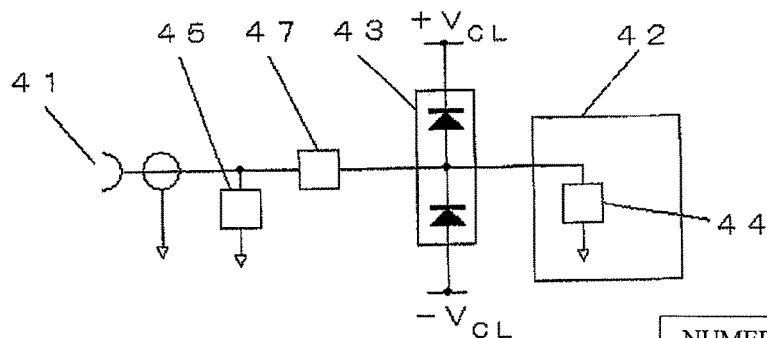
FIG. 4 shows an example of the input protection circuit for a high-speed analogue signal according to the present invention.

FIG. 4 shows an example of the input protection circuit for a high-speed analogue signal. A resistor 47 is inserted in the analogue-signal path extending from an input connector 41 to an input circuit 42. A polymer ESD protection element 45 is connected between a portion of the signal path, which extends from the resistor 47 to the input connector 41, and the ground. A semiconductor ESD protection element 43 is connected between a portion of the signal path, which extends from the resistor 47 to the input circuit 42, and a power line $+V_{CL}$, and also between the same portion and a power line $-V_{CL}$. The sum of the resistance value of an input resistor 44 of the input circuit 42 and that of the resistor 47 is equal to the characteristic impedance of the high-speed analogue signal input.

The polymer ESD protection element 45 should preferably be connected to a point as close to the input connector 41 as possible so that a high current resulting from an electrostatic discharge can be directed into the ground through a short path. When an electrostatic discharge occurs, the voltage at the point where the polymer ESD protection element 45 is connected to the signal path temporarily rises to a trigger voltage of 100 V or higher. After the polymer ESD protection element 45 is turned to the conducting state, the voltage falls to a clamping voltage of several tens volts and then gradually declines with the decrease in the energy of the electrostatic discharge. Accordingly, a pulse-resistant resistor or surge-resistant resistor is used as the resistor 47 to prevent the resistor from being damaged by the application of the trigger voltage or clamping voltage. The amount of the current flowing into the resistor 47 and semiconductor ESD protection element 43 is decreased since most of the electrostatic discharge energy is collected through the polymer ESD protection element 45 into the ground.

Thus, the present configuration allows the use of a relatively small package resistor and hence the selection of a resistor having a good high-frequency characteristic without increasing the inductance or capacitance of the package. Without the polymer ESD protection element 45, a resistor having a good high-frequency characteristic cannot be used as the resistor 47 since most of the electrostatic discharge energy would be consumed by this resistor.

Another advantage is that the decrease in the forward voltage drop across the diode of the semiconductor ESD protection element 43 increases the degree of stability of the voltage-clamping action.

In a measurement circuit for a high-speed analogue signal, the high-speed analogue signal is generally inputted through a coaxial cable having a characteristic impedance of 50Ω. Accordingly, for the purpose of impedance matching, the resistance value of the resistor 47 and that of the input resistor 44 of the input circuit 42 are selected so that their sum will be equal to 50Ω. In the present example, the resistance value of the resistor 47 is set at 40Ω and that of the input resistor 44 at 10Ω. This setting causes the gain of the analogue signal to be one fifth the original level. To compensate for this gain reduction, the gain of the input circuit 42 is raised to five times the original value to obtain a required signal intensity. Since the impedance observed from the semiconductor protection element 43 is decreased, the distortion or delay that may appear in the waveform at the rising portion or other portions of the signal is reduced.

Figure 1:
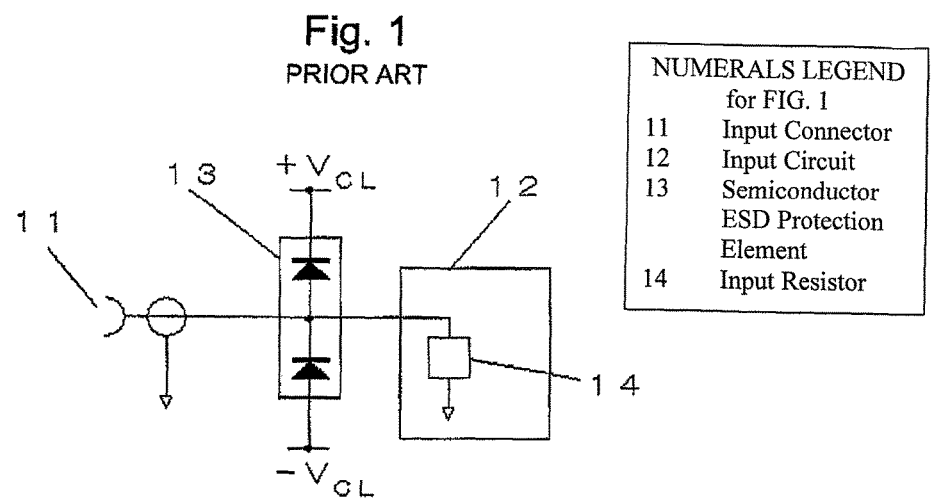
FIG. 1 shows an input protection circuit using a semiconductor ESD protection element.
Figure 2:
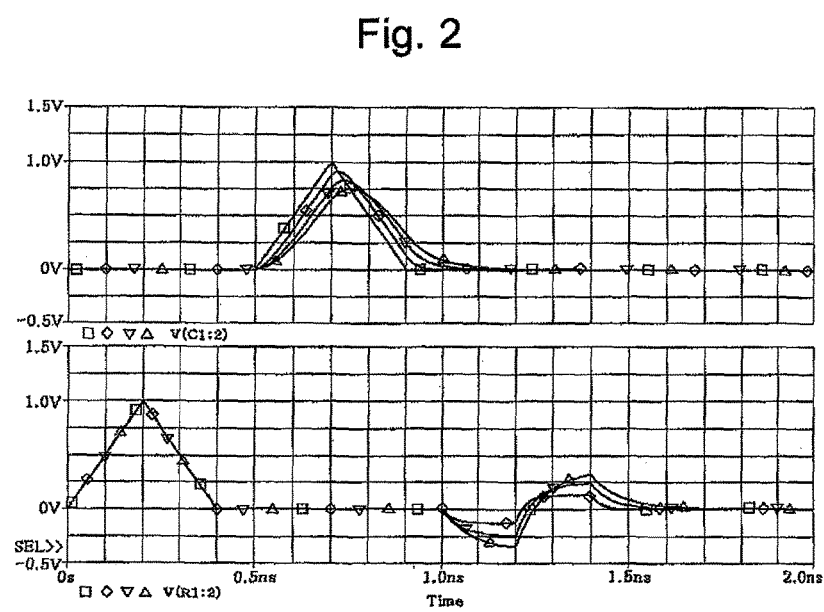
FIG. 2 shows a calculated example of the distortion and reflection of a high-speed pulse waveform by a semiconductor ESD protection element.
Figure 3:
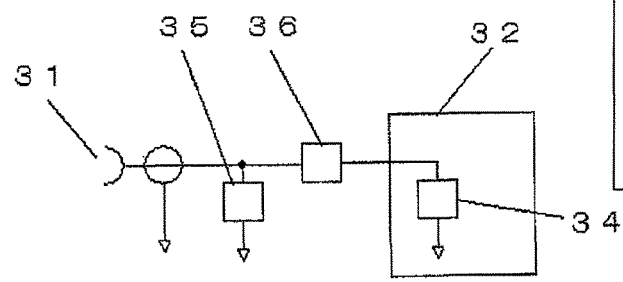
FIG. 3 shows an input protection circuit using a polymer ESD protection element.
Figure 5:
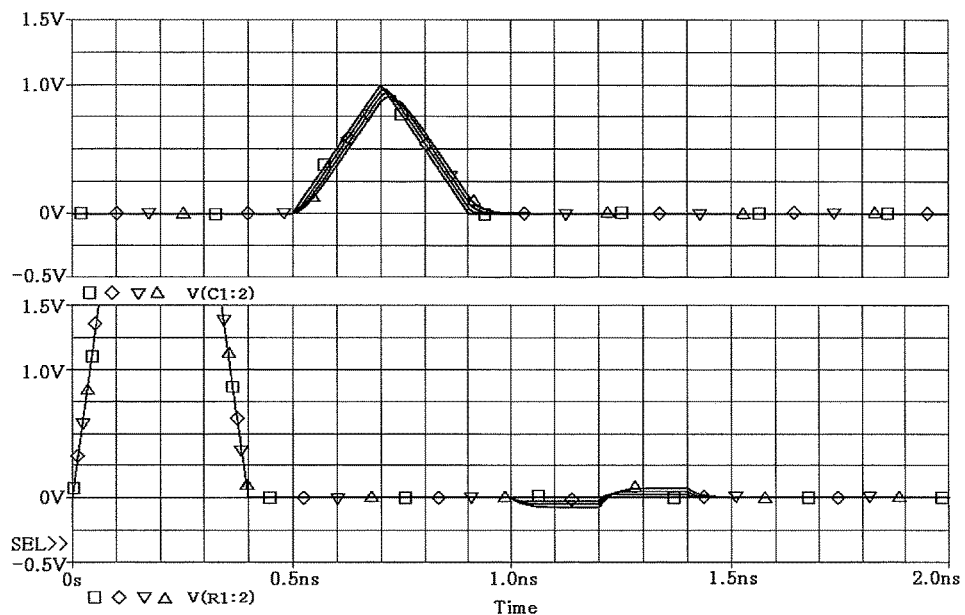
FIG. 5 shows a calculated example of the distortion and reflection of a high-speed pulse waveform by an input protection circuit according to the present invention.

FIG. 5 shows the result of a calculation performed, as in the case of FIG. 2, for each of the semiconductor ESD protection elements having the capacitances 0 pF, 1 pF, 2 pF and 3 pF, with the results indicated by the square, rhombic, inverted triangular, or triangular plots, respectively. The lower section of FIG. 5 shows the voltage waveform at the transmitting end of the coaxial cable, whereas the upper section shows the voltage waveform in the input circuit. The figure clearly shows that the voltage drop is smaller than in FIG. 2, and so is the amplitude of the reflected wave. It should be noted that, for the purpose of comparison with FIG. 2, the peak height of the input pulse at the transmitting end in FIG. 5 has been multiplied by five since the signal intensity in the input circuit 42 is reduced to one fifth as a result of the aforementioned setting of the resistance ratio of the resistor 47 and the input resistor 44.

In actual measurement circuits for high-speed analogue signals, it is impossible to extremely increase the gain because it will cause other problems, such as an increase in the noise level. However, it is possible to select an appropriate gain corresponding to the frequency band or signal waveform of the analogue signal to be measured, whereby an improvement effect corresponding to the selected gain can be obtained.

Thus, the input protection circuit for a high-speed analogue signal according to the present invention reduces the distortion or delay of the input waveform due to the capacitance of the protection element inserted for the purpose of ESD protection, so that the waveform of the high-speed analogue signal can be correctly determined.

Figure 6:
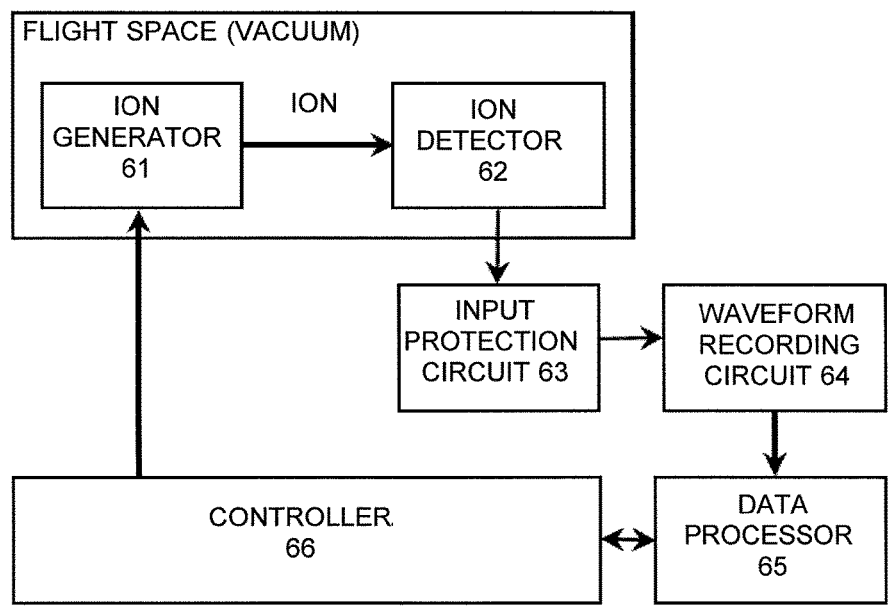
FIG. 6 shows an example of the time-of-flight mass spectrometer using an input protection circuit for a high-speed analogue signal according to the present invention.

The input protection circuit for a high-speed analogue signal according to the present invention can be used for the protection of a waveform-recording circuit of a device that handles signals at high frequencies, such as a time-of-flight mass spectrometer. FIG. 6 shows an application example for the time-of-flight mass spectrometer. Ions are generated in an ion generator 61 at points in time determined by a control circuit 66. The generated ions fly through a vacuum space toward an ion detector 62, each ion taking a specific length of time corresponding to its mass-to-charge ratio (mass/charge) to arrive at the detector 62. The arrival of an ion causes the ion detector 62 to produce an analogue signal, which is transmitted to a waveform-recording circuit 64 through an input protection circuit 63 for a high-speed analogue signal according to the present invention. The signals obtained by the waveform-recording circuit 64 are collected by a data processor 65, which creates a mass spectrum.

If an electric discharge should occur in the vacuum and induce a high-voltage pulse in the analogue-signal path, the input protection circuit 63 for a high-speed analogue signal, which is located between the ion detector 62 and the waveform-recording circuit 64, prevents the high-voltage pulse from reaching the waveform-recording circuit 64. Although the input protection circuit is provided between the ion detector and the waveform-recording circuit, the distortion or delay observed in the waveform at the rising portion of the signal is reduced since the input protection circuit according to the present invention has a low impedance when observed from the semiconductor protection element. Thus, the present invention can reduce the error of mass measurement values and improve the mass resolution.

It should be noted that the previously described embodiment is a mere example of the present invention; any change or modification that is appropriately made within the spirit of the present invention will evidently fall within the scope of the present invention.

INDUSTRIAL APPLICABILITY

The input protection circuit for a high-speed analogue signal according to the present invention can be used in any device with a circuit that handles signals at high frequencies. For example, it can be used to protect the waveform-recording circuit of a time-of-flight mass spectrometer.

The invention claimed is:
1. A time-of-flight mass spectrometer, comprising:
an ion detector that produces a high-speed analogue signal;
a waveform recorder for collecting the high speed analogue signal produced by the ion detector, and
an input protection circuit for a high-speed analogue signal provided between the ion detector and the waveform recorder, the input protection circuit including:
an input connector;
an input circuit;
a signal path resistor provided on a signal path connecting the input connector and the input circuit;
a polymer ESD protection element connected between a portion of the signal path, which extends from the signal path resistor to the input connector, and a ground; and
a semiconductor ESD protection element connected between a portion of the signal path, which extends from the signal path resistor to the input circuit, and either the ground or a power source,
where a sum of a resistance value of an input resistor of the input circuit and a resistance value of the signal path resistor is equal to a characteristic impedance of the high-speed analogue signal input,
the resistance value of the input resistor is less than the resistance value of the signal path resistor such that a gain of the high-speed analogue signal is reduced, and
a gain of the input circuit is increased to compensate for the reduction in the gain of the high-speed analogue signal.
2. The time-of-flight mass spectrometer according to claim 1, which is further characterized in that the resistor is a pulse-resistant resistor or surge-resistant resistor.
3. The time-of-flight mass spectrometer according to claim 1, wherein the polymer ESD protection element is connected to a point close to the input connector so that no additional element is placed between the connector and the polymer ESD protection element and a high current resulting from an electrostatic discharge can be directed into the ground through a short path.
4. The time-of-flight mass spectrometer according to claim 2, wherein the polymer ESD protection element is connected to a point close to the input connector so that no additional element is placed between the connector and the polymer ESD protection element and a high current resulting from an electrostatic discharge can be directed into the ground through a short path.

* * * * *